United States Patent [19]

Dunbar

[11] Patent Number: 4,820,931

[45] Date of Patent: Apr. 11, 1989

[54] WET BENCH FLAME AND DROPLET DETECTOR

[75] Inventor: Robert A. Dunbar, Swampscott, Mass.

[73] Assignee: Pyrotector, Inc., Marshfield, Mass.

[21] Appl. No.: 162,694

[22] Filed: Mar. 1, 1988

[51] Int. Cl.[4] ........................ G08B 17/12; G01V 9/04

[52] U.S. Cl. ................................ 250/554; 250/222.2; 250/342; 340/578

[58] Field of Search .................. 250/554, 222.2, 222.1, 250/342, 339, 338.3, 221; 340/578, 577; 377/53

[56] References Cited

U.S. PATENT DOCUMENTS

| | | | |
|---|---|---|---|
| 3,967,255 | 6/1976 | Oliver et al. | 250/554 |
| 4,280,058 | 7/1981 | Tar | 250/554 |
| 4,533,834 | 8/1985 | McCormack | 250/554 |
| 4,639,605 | 1/1987 | Seki et al. | 340/578 |

OTHER PUBLICATIONS

Siemens Product Literature, "BP-103 Series Silicon Phototransistor", pp. 384–385.

*Primary Examiner*—David C. Nelms

*Assistant Examiner*—Michael Messinger

[57] ABSTRACT

A system for detecting a flame or droplets of burning polypropylene in an area below an upper surface of a conventional wet bench used in semiconductor production includes at least one sensor, a threshold detector, a discrimination, a counter and a latch. The sensor detects radiation generated by activity in the area and for generating a sensor signal in response to the detected radiation. The threshold detector determines whether the activity has a cross-sectional area which exceeds a predetermined threshold area. The discriminator determines whether the activity displays a flicker rate or a droplet rate that is within the predetermined flicker rate range. The counter determines whether a predetermined number of flickers or droplets has been detected within a predetermined time period, and the latch asserts a true output signal when the detected activity exceeds the predetermined threshold area, the flicker rate or the droplet rate is within the predetermined flicker rate range, and a predetermined number of flickers or droplets have been detected within the predetermined time period.

25 Claims, 5 Drawing Sheets

WET BENCH FLAME AND DROPLET DETECTOR

BACKGROUND OF THE INVENTION

This invention relates to the detection of flames, in particular in the vicinity of a conventional wet bench of the type used in the production of VLSI integrated circuit chips. These wet benches are located in so-called "clean rooms", areas which are maintained in an essentially contaminent free state.

Conventional wet benches (see FIG. 1) are constructed of polypropylene and include a table-top surface and a series of tubs (in the form of deep depressions in the surface), each tub containing one of several hydrocarbon solvents. Heating elements are located below the tubs and are used to heat the hydrocarbon solvents contained therein. A plenum, spanning the entire length of the bench, is located below the heating elements and serves as a collection area for expended solvents. The plenum also serves as a condensation tank for solvent fumes drawn into the plenum by a constant flow of air from above the wet bench. The volatile nature of the hydrocarbon solvents, in combination with the necessity of heating some of the solvents, results in an above average risk of fire.

Coupled with the increased risk of fire is the extraordinary monetary loss, in terms of clean-up costs and lost production time, which results from clean room fires; these costs are typically in the millions, and possibly even billions, of dollars. The extraordinary size of the loss results from the necessity of shutting down at least the clean room (if not the entire section of the plant in which the clean room is located) and removing the contaminants in the event of fire. It is therefore extremely desirable to detect and suppress any fires which occur in the vicinity of a wet bench, including those which occur in the plenum.

The detection of a flame generated by burning hydrocarbon solvents presents severe technical difficulties. One difficulty is the highly caustic nature of the solvents contained in the tubs of a wet bench. The presence of these solvents effectively precludes the use of a conventional glass window to cover and protect the sensor; a substance must be used which is inert in the presence of these solvents.

Another difficulty is the prevention of false alarms. A detector must be able to distinguish between flames generated by hydrocarbon solvents, to which a response is desired, and other sources of heat and flame, including bunsen burners and electric welding torchs, which a detector should ignore.

As a fire begins to burn, clouds of fumes (from water based chemicals used in chip production) may obscure a detector, preventing it from detecting the presence of the hidden flames. A detector must thus be able to detect a form of radiation which can be 'seen' through the clouds (i.e. a form of radiation not readily absorbed by water based chemicals).

In the plenum, additional difficulties arise from the increased concentration of fumes and the great sensitivity which a detector operating in the plenum must possess in order to detect flames occuring the length of the plenum (i.e. up to eight feet away).

Polypropylene is used in construction of the bench because it is inert in the presence of the solvents typically encountered in chip production. Unfortunately, polypropylene melts and burns; when a fire occurs in one of the tubs, one of the first detectable signs may be burning polypropylene droplets dripping into the plenum. It is thus desirable for a detector operating in the plenum to be capable of detecting these burning droplets. It has been observed that when polypropylene burns, droplets occur at a rate of approximately two droplets per second.

Finally, even where the fire is detected and a chemical suppressant released, the possibility exists that the fire may not wholly be extinguished, or even if extinguished, that it may reignite. It is therefore desirable to employ a "multishot" system, capable of detecting and responding to a secondary fire. This requires that the detector be capable of determining when the primary fire is apparently extinguished and, in response, suspending the release of the chemical suppressant, and that the detector be capable of functioning in the presence of the chemical suppressant so as to detect the secondary fire.

SUMMARY OF THE INVENTION

According to the invention, a system for detecting a flame or droplets of burning polypropylene in an area below an upper surface of a conventional wet bench used in semiconductor production, the flame having a predetermined characteristic flicker rate range and a predetermined characteristic radiation profile, the droplets occurring at a predetermined rate within the predetermined flicker rate range, comprises at least one sensor for detecting radiation generated by activity in the area and for generating a sensor signal in response to the detected radiation, a threshold detector for determining whether the activity has a cross-sectional area which exceeds a predetermined threshold area, a discriminator for determining whether the activity displays a flicker rate or a droplet rate that is within the predetermined flicker rate range, a counter for determining whether a predetermined number of flickers or droplets has been detected within a predetermined time period, and a latch for asserting a true output signal when the detected activity exceeds the predetermined threshold area, the flicker rate or the droplet rate is within the predetermined flicker rate range, and the predetermined number of flickers or droplets have been detected within the predetermined time period.

Preferred embodiments of the invention include one or more of the following features. The threshold detector determines whether the activity has a cross-sectional area which exceeds the predetermined threshold area by comparing the sensor signal to a threshold signal. The threshold detector generates signal events, each signal event corresponding to a single flicker or droplet of activity, and the discriminator determines whether the activity displays a rate that is within the predetermined flicker rate range by suppressing operation of the counter unless the signal events are being received at the discriminator at a rate that is within the predetermined flicker rate range, preferably the counter determines whether a predetermined number of flickers or droplets has been detected within a predetermined time period by counting the signal events being received by the counter, which comprises counting means for asserting a true counter signal when the counter has recieved a number of signal events equal to the predetermined number of flickers or droplets within the predetermined time period, and for maintaining the true counter signal asserted so long as a number of signal events has been received within the predetermined time period. More preferably when the latch asserts a true output signal, the latch continues to assert a true output signal until the counter signal becomes false and remains false for a second predetermined time period, preferably one second. The system further comprises suppression means for extinguishing the flame, and preferably further comprises control means, responsive to said latch, for activiating the suppression means, which may comprise release means for releasing chemical suppressant. Preferably the sensor is capable of detecting radiation generated by a flame in an atmosphere containing the chemical suppressant, the control means includes means for controlling the suppression means to halt release of the chemical suppressant when the output signal from the latch becomes false, and means for controlling the suppression means to reinitiate release of chemical suppressant if the latch reasserts the true output signal. The predetermined threshold area is 3.14 square inches. The predetermined flicker rate range is ½ Hz to 30 Hz. The predetermined number of flickers or droplets is between 4 and 12, and preferably is eight. The predetermined time period is between 0.5 second and 3 seconds, and preferably is 2 seconds. The sensor comprises a radiation sensor sensitive to infrared radiation, and further comprises a filter. The radiation sensor is sensitive to electromagnetic radiation having wavelengths between 0.4 micron and 1.1 microns. The filter comprises a wratten filter having a pass band extending from 0.8μ to 1.0μ. The system further comprises a polyethylene window. The area below the upper surface comprises a plenum, preferably the plenum comprises an atmosphere containing water-based chemical fumes, and the sensor is capable of detecting flames or droplets in the atmosphere containing the fumes. More preferably, the window is interposed between sensor and plenum. The sensor is capable of detecting flames or droplets at a distance of at least 8 feet.

These and other features and advantages of the invention will be apparent from the following description of a presently preferred embodiment and from the claims.

DESCRIPTION OF THE PREFERRED EMBODIMENT

We first briefly describe the drawings.

Structure

Figure 1:
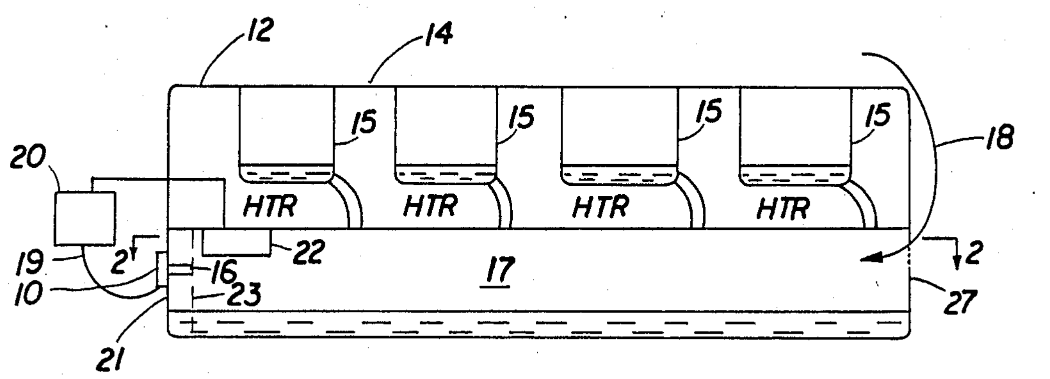
FIG. 1 is a somewhat diagrammatic side view of a typical wet bench semiconductor production area equipped with a flame detector according to the present invention.

Referring to FIG. 1, a conventional wet bench 12, located in a so-called "clean room", includes an upper surface 14, a series of tubs 15 containing various hydrocarbon solvents or strong acids and bases, and a plenum 17 into which expended solvents are deposited. Plenum 17 also serves as a condensation tank for solvent fumes drawn into the plenum from above the bench by a constant flow of air (as indicated by arrow 18).

A flame detector 10 is located in one of the walls 21 of plenum 17 so as to detect any flames or burning droplets of polypropylene which may exist within plenum 17. Detector 10 includes a sensor 16 capable of detecting infrared radiation indicative of an open flame or polypropylene drops burning and falling at a rate of one or more drops per second.

Figure 2:
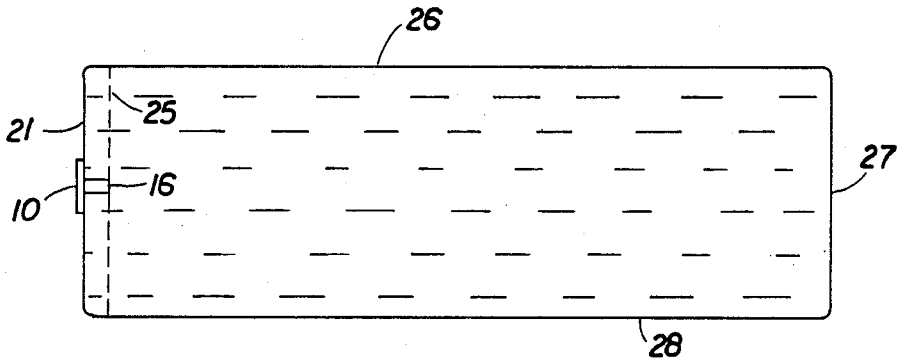
FIG. 2 is a similar view, taken from the top of the plenum area of the wet bench of FIG. 1.

Referring to FIGS. 1 and 2, sensor 16 has a 180° solid angle field of vision (as indicated by dashed lines 23 (FIG. 1) and dashed lines 25 (FIG. 2)) and is thus capable of detecting radiation within the volume defined by dashed lines 23, 25 and walls 26, 27, 28 of plenum 17.

Detector 10 is connected via a wire 19 to a controller 20. Controller 20 is connected to a suppression system 22. In response to a signal from detector 10 indicating an alarm condition (e.g., an open flame), controller 20 can command suppression system 22 to release a chemical suppressant (e.g. Halon® as sold by E. I. du Pont de Nemours Company, Inc. of Wilmington, Del.), to thereby extinguish the flame.

Figure 3A:
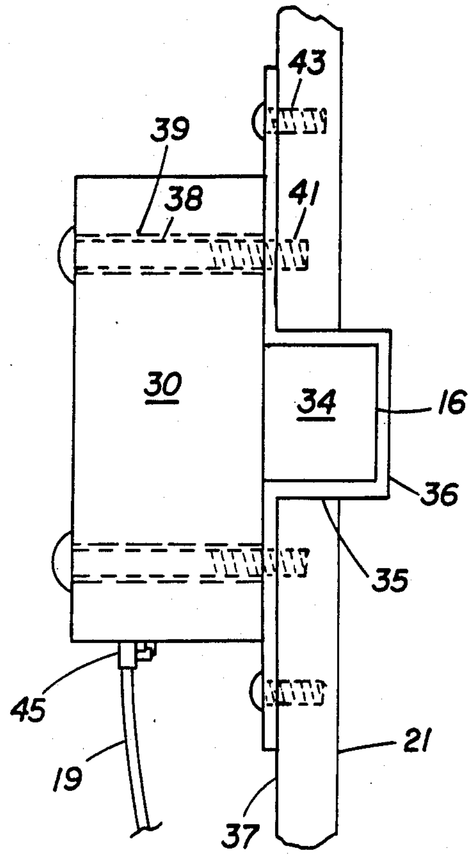
FIGS. 3A and 3B are a side view and a top plan view, respectively, of the flame detector of FIG. 1.
Figure 3B:
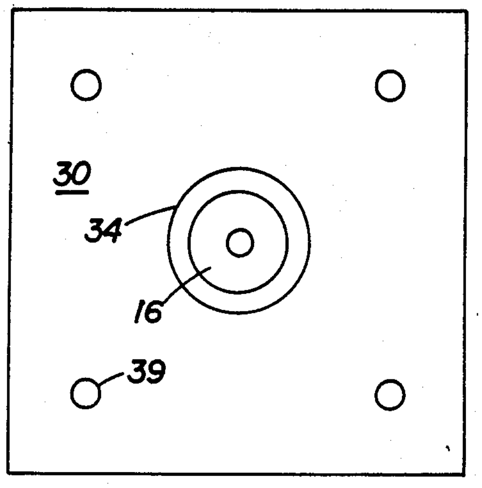

Referring to FIGS. 3A, 3B, detector 10 includes a main body section 30 of length, L, width, W, and thickness T, e.g. 4 inches×4 inches×2.5 inches, and a sensor section 34 containing sensor 16 and, covering sensor 16, a spectral wratten filter 23 (commercially available from Kodak; Model #81C). Sensor section 34 is inserted through a hole 35 in wall 21 such that sensor 16 is situated on the interior of plenum 17 while main body section 30 remains outside of plenum 17 (and thus is not exposed to the caustic environment therein). Sensor section 34 and sensor 16 are not, however, in direct contact with the interior plenum 17; interposed between sensor section 34 and the interior of plenum 17 is a transparent polyethylene plastic shield 36. Shield 36 covers section 34 and extends out through hole 35 and along the exterior 37 of wall 21, between wall 21 and section 30. Polyethylene, like polypropylene, is inert in the presence of the solvents typically encountered in wet bench operation. Main body section 30 is secured to wall 19 by four bolts 38 extending through bolt holes 39 and holes 41 in shield 36 and into wall 21. Shield 36 is also independently secured to wall 21 by bolts 43. Wire 19 is connected to main body section 30 by a a connector 45.

Figure 4:
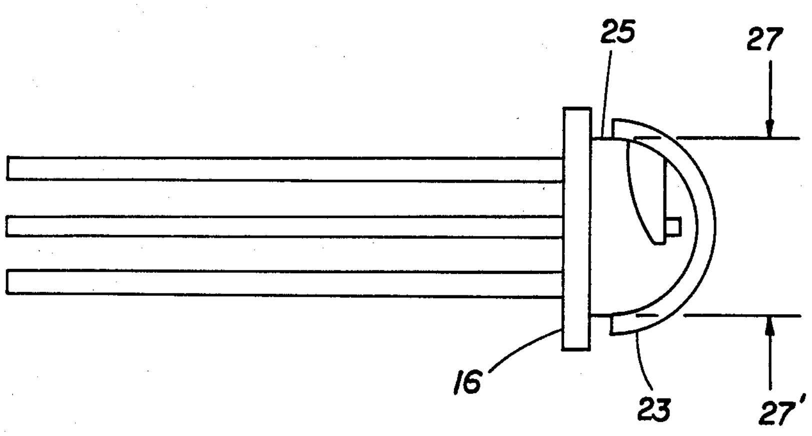
FIG. 4 is a side view of a sensor.

Referring to FIG. 4, sensor 16 is a silicon phototransistor (e.g., an epitaxial NPN silicon planar phototransistor, commercially available from Siemens; Model #BP-103) capable of detecting electromagnetic radiation having wavelengths between 0.4 μm and 1.1 μm. The wavelengths to which the detector will respond, however, are limited by wratten filter 23. Filter 23 operates in the so-called near infrared band and has an operating range of 0.8μ to 1.0μ. Sensor 16 will thus generate an output signal only when infrared radiation within the range 0.8μ to 1.0μ is being generated within its field of view. Sensor 16 includes a glass-clear plastic cover 25 and is sensitive to radiation within the region indicated by arrows 27 and 27'.

Figure 5:
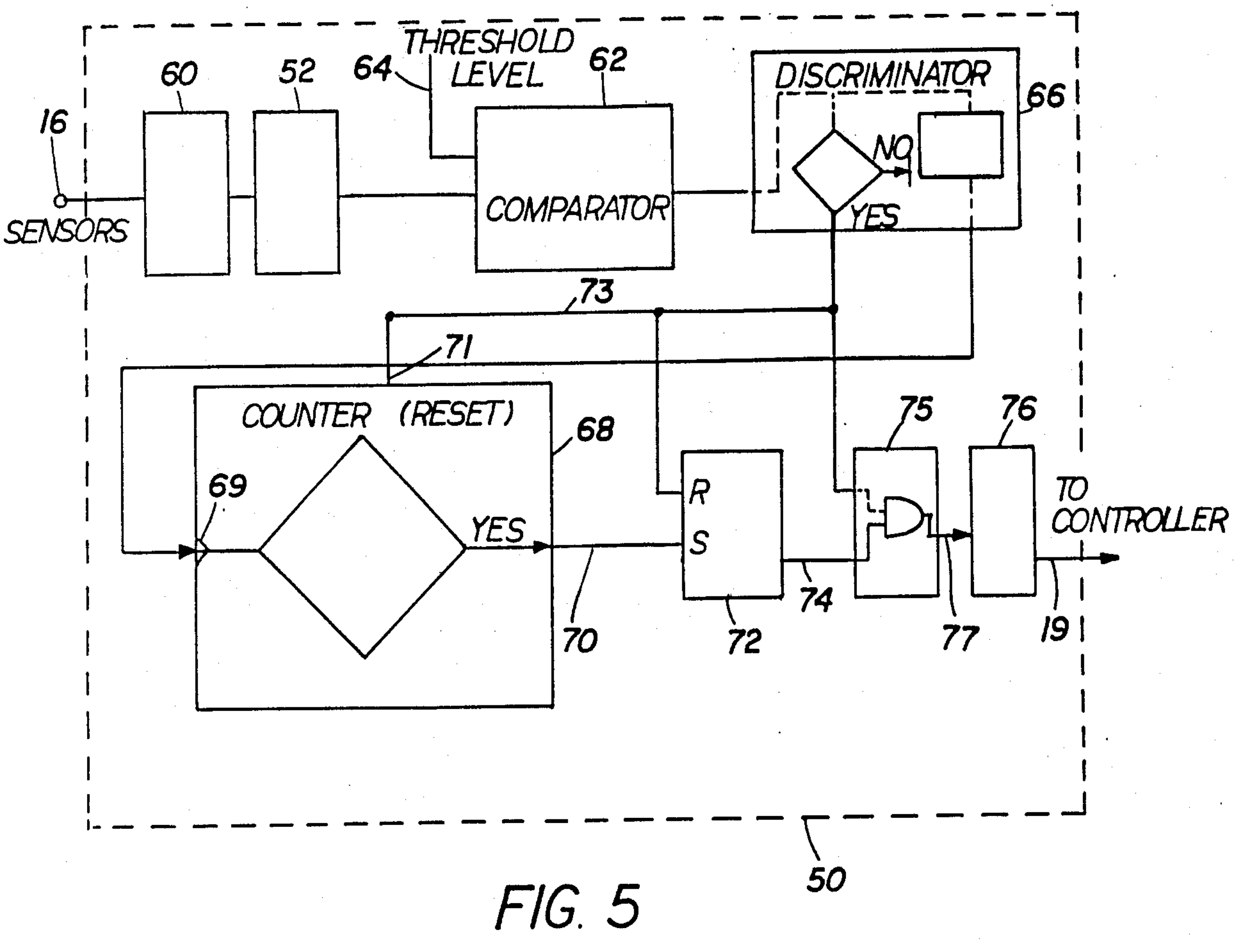
FIG. 5 is a block diagram of the circuitry comprising the flame detector of FIG. 1.

Referring to FIG. 5, sensor 16 is connected to detector circuitry 50 housed within lower section 30 of detector 10 (FIG. 3A).

In operation, detector 10 detects and analyzes radiation generated by activity in plenum 17. If the detected activity is determined to be a flame generated by burning hydrocarbon solvents or burning polypropylene drops, and if the flame is of a predetermined size and duration, an alarm condition is said to exist, and an alarm signal is sent to controller 20.

Flames generated by burning hydrocarbon solvents display several known characteristics which are utilized in determining whether detected activity constitutes an alarm condition.

As noted above, one of these characteristics is the radiation profile generated by such flames. That the detected activity displays the expected radiation profile is assured by the use of wratten spectral filter 81C.

Another characteristic of hydrocarbon solvent flames is a predictable flicker rate, typically 3–15 Hz. Any activity which displays a flicker rate of at least 3 Hz, and the expected radiation profile, can thus be categorized as a hydrocarbon solvent flame (detector 10 will actually respond to a flicker rate of between ½–15 Hz). The use of this frequency range (i.e. ½–15 Hz) also permits the detection of burning polypropylene droplets, which drip at approximately 2 droplets per second (i.e. 2 Hz.) Finally, the use of this frequency range prevents fluorescent lights (which emit some infrared radiation and which have a flicker rate of 120 Hz) from causing a false alarm.

Even after detected activity has been identified as a hydrocarbon flame, however, it must continue to exist for at least one second (this latter requirement prevents flashes which do not result in a continuing flame from unnecessarily triggering the release of the chemical suppressant.)

Whether any given signal generated by sensor 16 satisfies the above defined criteria is determined by circuitry 50. Circuitry 50 includes an amplifier 60 which is connected to and amplifies any signal generated sensor 16. The amplified signal is next passed to an active filter 52, which suppresses any component of the signal having a frequency of greater than 15 Hz. The signal, as filtered, is passed on to a comparator 62 which determines, based on a comparison of the voltage level of the amplified, filtered signal with a threshold voltage level 64. If the voltage level of the amplified signal is greater than the threshold voltage level, a signal event is generated by comparator 62. Signal events generated by comparator 62 are received by a discriminator 66, which determines whether the arriving signal events display a flicker rate corresponding to a hydrocarbon solvent flame, i.e. between ½ and 15 Hz. If the arriving signal events display the required flicker rate, discriminator 66 works in concert with the next circuit, a counter 68, to determine whether the detected activity has a duration of at least 1.5 to 2 seconds. For each signal event received by discriminator 66, a short pulse is generated on a line 67 which is received at a clock input 69 of counter 68. If discriminator 66 is receiving signal events at the required rate (½–15 Hz), it provides counter 68 with a two second window of opportunity (by holding the reset input 71 of counter 68, which is connected to discriminator 66 via a line 73, low for two seconds) during which counter 68 counts pulses (representing flickers) received from discriminator 66. If, during the two second window of opportunity, at least eight pulses are counted, the durational requirement is deemed to have been met and an outgoing line 70 is asserted by counter 68. (If eight flickers do not appear, counter 68 is reset by discriminator 66. Line 73 remains low as long as discriminator 66 continues to receive signal events at the required rate.)

Line 70 forms one input to a flip flop circuit 72; the other input to flip-flop circuit 72 is connected to line 73. When line 70 is asserted by counter 68, if line 73 is currently low, flip-flop circuit 72 is set and outgoing line 74 is asserted; if, after flip-flop circuit 72 is set, line 73 is reasserted, flip flop circuit 72 is reset, and outgoing line 74 will go low. Requiring that line 73 be low before outgoing line 74 is asserted assures that a flame continues to be detected by detector 10 (because that input to flip flop circuit 72 is not subject to the two second delay of counter 68). Line 74 is one input to an AND circuit 75; line 73 forms the other input to AND circuit 75; if line 74 is asserted (indicating that eight flickers were detected within two seconds) and line 73 is low (indicating that a flame continues to be detected) outgoing line 77 is asserted. The assertion of line 77 causes latch 76 to become latched; that is, to generate an output signal on line 19 to controller 20. Latch 76 only becomes unlatched (reset) if line 77 becomes unasserted for one second or more.

Figure 6:
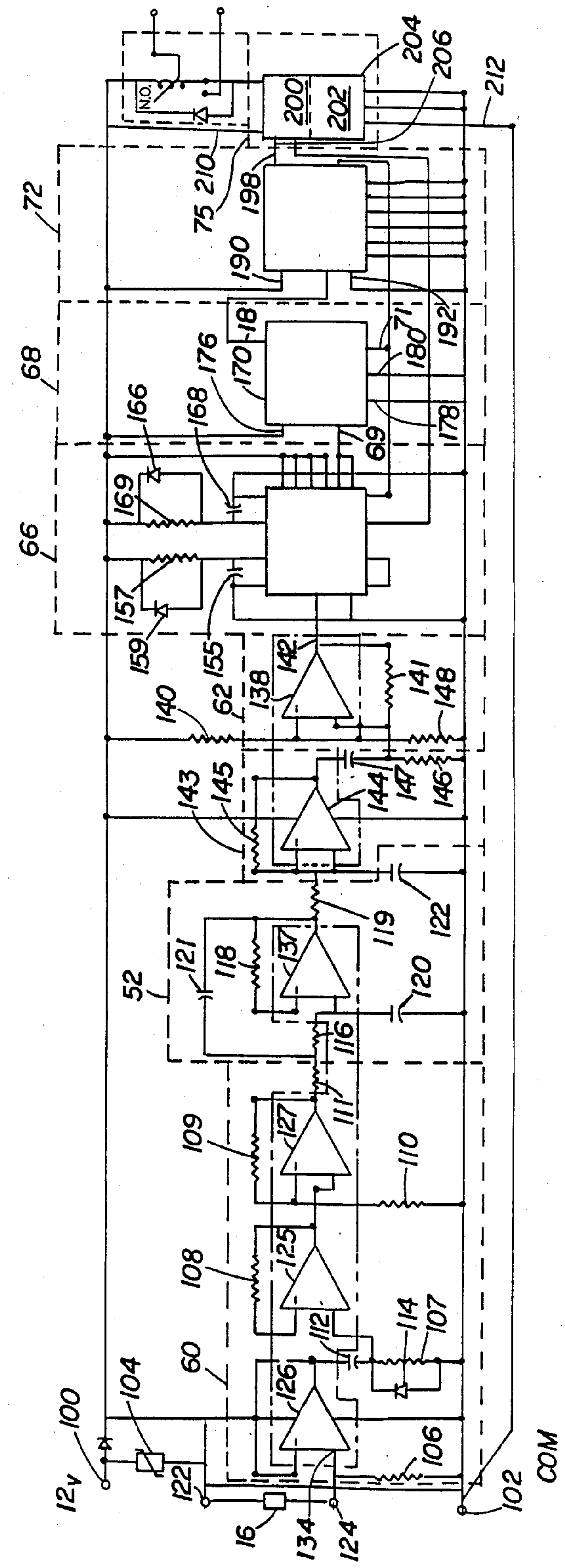
FIGS. 6 and 6A are more detailed circuit diagrams of the circuitry of FIG. 5.

Referring to FIG. 6, circuitry 50 is connected to a 12 v source at a terminal 100 and to ground at a terminal 102. A varistor 104 is connected between terminals 100 and 102.

Sensor 16 is connected to circuitry 50 at a terminal 122 (which is connected to the 12 v source) and at a terminal 124.

The signal generated by sensor 16 is received by circuitry 50 at terminal 124. The received signal is amplified by amplifier 60, which includes an operational amplifiers 125, 126, 127 (e.g. from a package of four op-amps, LM234) which in combination with resistors 106 (220KΩ), 107 (10KΩ), 108 (10KΩ), 109 (100KΩ), (10KΩ), 111 (10KΩ), capacitor 112 (22μF; e.g. Sprague 196D, package K), and diode 114 (equal to ¼ watt resistor in size), are configured as buffer amplifiers. Terminal 124 is connected to the non-inverting input 134 of op amp 126; op-amp 126, and following op-amps 125, 127 (short descrip. of buffer amps. needed) Line 136 is connected to active filter 52, which consists of an operational amplifier 137 (e.g. one of four op-amps contained within a single package LM234) configured, in combination with resistors 116 (10KΩ), 118 (20KΩ), 119 (10KΩ), and capacitors 120 (1μF), 121 (2.2μF), 122 (1μF), as an active butterworth filter. Filter 52 has a pass band with an upper limit of approximately 15 Hz. The signal output by filter 52 on line 139 is passed, via a buffer amplifier 143 (which includes an op-amp 144, resistors 145 (10KΩ), 146 (10KΩ), and capacitor 147 (33μF)), to comparator 62 which, using an op amp 138 and associated resistors 140 (100KΩ), 141 (1.5 MΩ), 148 (1KΩ), compares the voltage level of the amplified signal to threshold voltage level 64. When the voltage level of the amplified signal exceeds threshold level 64, op-amp 138 saturates and a signal event is generated on a line 142 connected to discriminator 66, which determines whether the rate at which signal events occur is within the expected flicker rate range (corresponding to the flicker rate a hydrocarbon of flame).

Figure 6A:
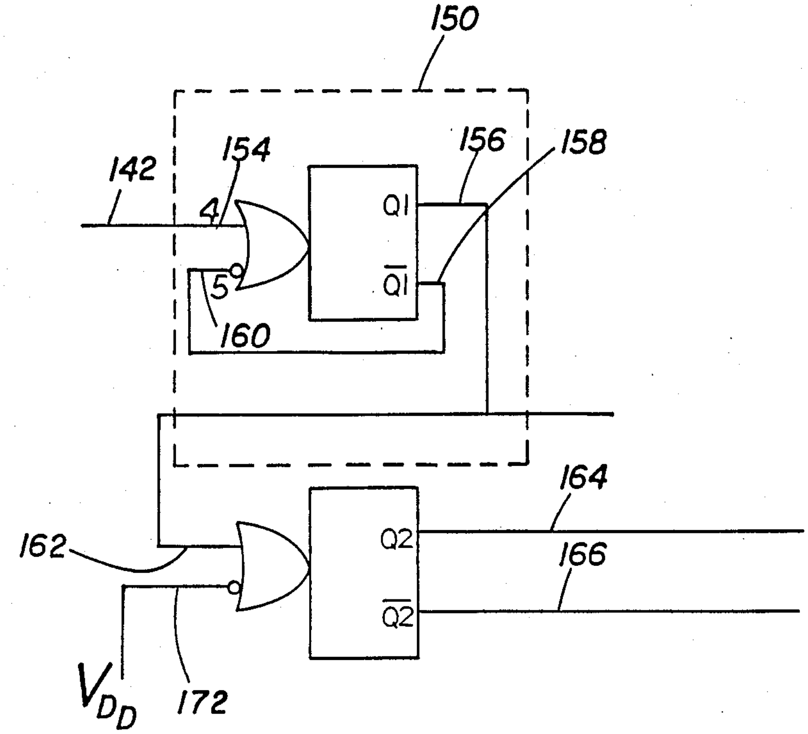

Referring to FIGS. 6, 6A, discriminator 66 is comprised of a pair of monostable multivibrators 150, 152 (preferrably contained within a single chip, e.g., Motorola MC14538BE). Line 142 is connected to the A input 154 of the first multivibrator 150 such that an arriving signal event causes a pulse to be generated at the Q1 output 156, and a negative pulse of equal duration to be generated at the Q1 output 158, (the duration of the pulses is detemined by the values of capacitor 155 (10μF) and resistor 157 (22KΩ); the relation is approximately T (in sec.) =R (in ohms)×C (in farads)). Q1′ output 158 is connected back to the inverted B input 160 of multivibrator 150 such that, for the duration of the pulse, multivibrator 150 cannot be retriggered. This effectively prevents multiple signal events occurring at a frequency of greater than 15 Hz from causing multiple output pulses to be generated at Q1 output 156.

Q1 output 156 is connected to the A input 162 of multivibrator 152 such that a pulse generated at Q1 output 156 will trigger multivibrator 152 to generate a pulse at Q2 output 164 (and a negative pulse at Q2 output 166). The pulses generated by Q2 output 164 are between 1.5 seconds and 2.0 seconds long (the duration of the pulses is determined by the values of capacitor 168 (10μF) and resistor 169 (220 KΩ)). (Discriminator 66 also includes two diodes 159, 166 ) Each new pulse from Q1 output 156 retriggers multivibrator 152 (because the inverted B input 172 is tied high) such that the Q2 output 164 will remain high as long as a new pulse is generated by Q1 output 156 before the expiration of the pulse generated at Q2 output 164, (i.e. as long as pulses are generated by Q1 output 156 every 1.5 to 2 seconds). This in turn requires that signal events are received at A input 154 at a frequency of at least ½ Hz (the lower limit of the required frequency range).

Q1 output 156 is also connected to counter 68, which determines whether at least eight flickers have been detected. Counter 68 is comprised of a single divide-by-8 counter 170 (e.g. Motorola CMOS Divide-By-8 Counter/Divider with 8 decoded outputs, CD4022A).-Q1 output 156 is connected to the clock input 69 (e.g. pin 14 of CD4022A) and Q2 output 166 is connected to the Reset input 71 (e.g. pin 15 of CD4022A) of divide-by-8 counter 170. (Terminals 176 and 178 (e.g. pins 16 and 8, respectively, of CD4022A) are connected to the 12 v power supply and ground, respectively. Clock inhibit 180 (e.g. pin 13 of CD4022A) is likewise connected to ground.)

Initially, prior to the arrival of a signal event at A input 154 of multivibrator 150, the Q2 output 166, and thus reset input 71, remain high, such that any pulses received at clock input 69 are ignored and the output 182 of counter 170 (e.g. pin 10 of CD4022A) remains low. When a signal event is received by A input 154, a pulse (177) is generated by Q1 output 156; because Q2 is high when pulse (177) is generated, however, it is ignored by counter 170. Pulse (177) will, however, cause a negative pulse (179) to be generated by Q2 output 166, such that reset input 71 goes low. Any subsequent pulses generated by Q1 output 156 will thus cause counter 170 to be incremented. If eight pulses are received before negative pulse (179) expires (i.e. within 1.5 to 2 secs.) output 182 will go high. If, however, eight pulses are not received, and negative pulse (179) expires, reset input 71 will be reasserted, such that eight new pulses must be counted by counter 170 before output 182 will be asserted.

Output 182 of counter 170 is connected to flip-flop circuit 72. Flip-flop circuit 72 comprises a D-type flip-flop 184 (e.g., one of two contained in Motorola CMOS dual D-type flip flop CD4013BE) configured to operate as a Set-Reset (RS) flip-flop (by connecting the data input 186 (e.g. pin 5 of CD4013BE) and the input 188 (e.g. pin 3 of CD4013BE) to ground). (Terminals 190, 192 (corresponding, e.g., to pins 14, 7, respectively, of CD4013BE) are connected to the 12 v power supply and ground respectively). Output 182 is connected to set input 194 and Q2 output 166 is connected to the reset input 196 of flip-flop 184. When output 182 is asserted, and Q2 output 166 is low, flip-flop 184 is set (the requirement that Q2 output 166 be low assures that signal events are continuing to be received at multivibrator 150, i.e. that the flame continues to exist) When flip flop 184 is set, its Q1 output 198 is asserted and remains asserted until and unless the reset input 196 is asserted.

Output 198 is connected within AND circuit 75 to one of two NAND buffer/drivers 200, 202 contained within a single integrated circuit 204 (e.g., Motorola CMOS dual 2-input NAND buffer/driver CD40107BE). Output 198 is connected to the A input 206 of NAND buffer/driver 200; Q2 output 164 is connected to the other, B input 208 of NAND buffer/-driver 200. (Terminals 210, 212 (e.g., corresponding to pins 8, 4 respectively of CD40107BE) are connected to the 12 v power supply and ground, respectively.)

Initially, when neither output 198 nor Q2 output 164 are asserted, the C output 214 of NAND buffer/driver 200 will be high (C=NOT (AB)). Output 214 is connected to latch 76 which includes a diode 218 and a switch 220. Latch 76 is connected to detector output 222, which is connected to the controller 20. As long as C output 214 remains high, switch 220 remains open, and no signal is sent to controller 20. Even when Q2 output 164 initially goes high (in response to a received signal event), C output 214 will remain high. Only when Q2 output 164 is high, and output 198 of flip-flop 184 is asserted, does the C output 214 of NAND buffer/driver 200 go low, causing switch 220 to close and a signal to be sent to controller 20, indicating that the required alarm condition has been detected Other embodiments of the invention are within the following claims:

1. A system for detecting a flame or droplets of burning polypropylene in an area below an upper surface of a conventional wet bench used in semiconductor production, said flame having a predetermined characteristic flicker rate range and a predetermined characteristic radiation profile, said droplets occurring at a predetermined rate within said predetermined flicker rate range, comprising at least one sensor for detecting radiation generated by activity in said area and for generating a sensor signal in response to said detected radiation, a threshold detector for determining whether said activity has a cross-sectional area which exceeds a predetermined threshold area, a discriminator for determining whether said activity displays a flicker rate or a droplet rate that is within said predetermined flicker rate range, a counter for determining whether a predetermined number of flickers or droplets has been detected within a predetermined time period, and a latch for asserting a true output signal when said detected activity exceeds said predetermined threshold area, said flicker rate or said droplet rate is within said predetermined flicker rate range, and a said predetermined number of flickers or droplets have been detected within said predetermined time period.

2. The system of claim 1, wherein said threshold detector determines whether said activity has a cross-sectional area which exceeds said predetermined threshold area by comparing said sensor signal to a threshold signal.

3. The system of claim 1 or 2, wherein said threshold detector generates signal events, each said signal event corresponding to a single flicker or droplet of said activity, and said discriminator determines whether said activity display a rate that is within said predetermined flicker rate range by suppressing operation of said counter unless said signal events are being received at said discriminator at a rate that is within said predetermined flicker rate range.

4. The system of claim 3, wherein said counter determines whether a said predetermined number of flickers or droplets has been detected within a said predetermined time period by counting said signal events being received by said counter, said counter comprising counting means for asserting a true counter signal when said counter has recieved a number of signal events equal to said predetermined number of flickers or droplets within said predetermined time period, and for maintaining said true counter signal asserted so long as a said number of signal events has been received within said predetermined time period.

5. The system of claim 4, wherein when said latch asserts a true output signal, said latch continues to assert a true output signal until said counter signal becomes false and remains false for a second predetermined time period.

6. The system of claim 5, wherein said second predetermined time period is 1 second.

7. The system of claim 1, further comprising suppression means for extinguishing said flame.

8. The system of claim 7, further comprising control means, responsive to said latch, for activiating said suppression means.

9. The system of claim 7 or 8, wherein said suppression means comprises release means for releasing chemical suppressant.

10. The system of claim 9, wherein said sensor is capable of detecting radiation generated by a flame in an atmosphere containing said chemical suppressant, said control means includes means for controlling said suppression means to halt release of said chemical suppressant when said output signal from said latch becomes false, and means for controlling said suppression means to reinitiate release of said chemical suppressant if said latch reasserts said true output 11. The system of claim 1, wherein said predetermined threshold area is 3.14 square inches.

12. The system of claim 1, wherein said predetermined flicker rate range is ½ Hz to 30 Hz.

13. The system of claim 1, wherein said predetermined number of flickers or droplets is between 4 and 12.

14. The system of claim 13, wherein said predetermined number of flickers or droplets is 8.

15. The system of claim 1, wherein said predetermined time period is between 0.5 seconds and 3.

16. The system of claim 15, wherein said predetermined time period is 2 seconds.

17. The system of claim 1, wherein said sensor comprises a radiation sensor sensitive to infrared radiation.

18. The system of claim 17, wherein said sensor further comprises a filter.

19. The system of claim 17 or 18, wherein said radiation sensor is sensitive to electromagnetic radiation having wavelengths between 0.4 microns and 1.1

20. The system of claim 17, wherein said filter comprising a wratten filter having a pass band from $0.8\mu$ to $1.0\mu$.

21. The system of claim 1, further comprising a polyethylene window.

22. The system of claim 1, wherein said area below said upper surface comprises a plenum.

23. The system of claim 22, wherein said plenum comprises an atmosphere containing water-based chemical fumes, and said sensor is capable of detecting said flames or said droplets in said atmosphere containing said fumes.

24. The system of claim 23, wherein said window is interposed between said sensor and said plenum.

25. The system of claim 1, wherein said sensor is capable of detecting said flames or said droplets at a distance of at least 8 feet.

* * * * *

UNITED STATES PATENT AND TRADEMARK OFFICE
CERTIFICATE OF CORRECTION

PATENT NO. : 4,820,931

DATED : April 11, 1989

INVENTOR(S) : Robert A. Dunbar

It is certified that error appears in the above-identified patent and that said Letters Patent is hereby corrected as shown below:

In the Specification:

Column 5, line 31, insert --by-- after "generated".

Column 5, line 65, "flip flop" is changed to --flip-flop--.

Column 6, line 6, "flip flop" is changed to --flip-flop--.

Column 6, line 30, insert --110-- at beginning of line before "(10KΩ)".

Column 6, lines 33-34, "op amp" is changed to --op-amp--.

Column 6, line 46, "op amp" is changed to --op-amp--.

Column 7, line 9, "at Q2 out-" is changed to --at Q2' out---.

Column 7, line 14, insert --.-- after "166".

Column 7, line 28, delete "-" at end of line.

CERTIFICATE OF CORRECTION

PATENT NO. : 4,820,931

DATED : April 11, 1989

INVENTOR(S) : Robert A. Dunbar

It is certified that error appears in the above-identified patent and that said Letters Patent is hereby corrected as shown below:

Column 7, line 46, "Q2" is changed to --Q2'--.

Column 7, line 59, "flip flop" is changed to --flip-flop--.

Column 7, line 61, insert --clock-- after "the".

Column 8, line 3, insert --.-- after ")".

In the Claims:

Column 10, line 3, insert --signal.-- after "output".

Column 10, line 15, insert --seconds.-- after "3".

Column 10, line 24, insert --microns.-- after "1.1".

Signed and Sealed this

Fourteenth Day of August, 1990

*Attest:*

HARRY F. MANBECK, JR.

*Attesting Officer*

*Commissioner of Patents and Trademarks*